(12) United States Patent
Dalsgaard et al.

(10) Patent No.: US 12,413,288 B2
(45) Date of Patent: Sep. 9, 2025

(54) METHOD, APPARATUS AND COMPUTER PROGRAM FOR BEAM REPORTING

(71) Applicant: Nokia Technologies Oy, Espoo (FI)

(72) Inventors: Lars Dalsgaard, Oulu (FI); Rafael Cauduro Dias De Paiva, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 34 days.

(21) Appl. No.: 18/597,746

(22) Filed: Mar. 6, 2024

(65) Prior Publication Data

US 2024/0348315 A1 Oct. 17, 2024

(51) Int. Cl.
*H04L 23/02* (2006.01)
*H04B 7/06* (2006.01)
*H04B 17/318* (2015.01)

(52) U.S. Cl.
CPC ....... *H04B 7/06958* (2023.05); *H04B 17/318* (2015.01)

(58) Field of Classification Search
CPC ...... H04B 17/11; H04B 17/12; H04B 7/0413; H04B 7/0639; H04B 17/221; H04B 7/061; H04L 25/0224; H04L 5/0051; H04W 12/041; H04W 52/0229
USPC ......................................... 375/262, 260, 267
See application file for complete search history.

(56) References Cited

U.S. PATENT DOCUMENTS

2022/0046747 A1* 2/2022 Da Silva ........... H04W 52/0229
2024/0333358 A1* 10/2024 Rupasinghe ............. H04B 7/10
2024/0357575 A1* 10/2024 Ashari ................ H04W 72/046

FOREIGN PATENT DOCUMENTS

WO     2018/084776 A1     5/2018
WO     2018/111004 A1     6/2018

OTHER PUBLICATIONS

"Revised WID: Requirement for NR frequency range 2 (FR2) multi-Rx chain DL reception", 3GPP TSG RAN Meeting #96, RP-221753, Agenda: 9.3.4.4, Qualcomm Incorporated, Jun. 6-9, 2022, 5 pages.

(Continued)

*Primary Examiner* — Khai Tran
(74) *Attorney, Agent, or Firm* — Barta Jones, PLLC

(57) ABSTRACT

There is provided an apparatus comprising means for: receiving, from a network node, a group based measurement event configuration comprising information indicating one or more trigger conditions associated with at least one group of beams, wherein each of the at least one group of beams comprises one or more beams associated with a first transmit-receive point and/or a second transmit-receive point; performing one or more beam measurements for the beams comprised in the at least one group of beams; determining, based on the one or more beam measurements, that at least one of the one or more trigger conditions is satisfied for one or more beams within the at least one group of beams; and in response to the determining, sending, to the network node, measurement reporting comprising at least one of: the one or more beam measurements on the one or more beams for which the at least one trigger condition is satisfied; information identifying the at least one trigger condition that was satisfied; and/or information identifying the one or more beams for which the at least one trigger condition is satisfied.

20 Claims, 8 Drawing Sheets

(56) References Cited

OTHER PUBLICATIONS

"WF on NR FR2 multi-Rx chain DL reception RRM requirements (part 1)", 3GPP TSG-RAN WG4 Meeting #106, R4-2303302, Agenda: 9.8.5, vivo, Feb. 27-Mar. 3, 2023, 2 pages.
"Topic summary for [106][209] FR2_multiRx _part1", 3GPP TSG-RAN WG4 Meeting # 106, R4-2302767, Agenda: 9.8.5, vivo, Feb. 27-Mar. 3, 2023, 45 pages.
"Topic summary for [106][210] FR2_multiRx_part2", 3GPP TSG-RAN WG4 Meeting # 106, R4-2302768, Agenda: 9.8.5, Qualcomm, Feb. 27-Mar. 3, 2023, 25 pages.
"3rd Generation Partnership Project; Technical Specification Group Radio Access Network; NR; Radio Resource Control (RRC protocol specification (Release 17)", 3GPP TS 38.331, V17.3.0, Dec. 2022, pp. 1-1318.
"3rd Generation Partnership Project; Technical Specification Group Radio Access Network; NR; Multiplexing and channel coding (Release 17)", 3GPP TS 38.212, V17.4.0, Dec. 2022, pp. 1-202.
"3rd Generation Partnership Project; Technical Specification Group Radio Access Network; NR; User Equipment (UE) radio access capabilities (Release 17)", 3GPP TS 38.306, V17.3.0, Dec. 2022, pp. 1-253.
"Msc-generator", Sourceforge, Retrieved on Mar. 4, 2024, Webpage available at :https://sourceforge.net/projects/msc-generator/.
"Discussion on L1 enhancements for inter-cell beam management", 3GPP TSG RAN WG1 #111, R1-2211250, Agenda: 9.12.1, Spreadtrum Communications, Nov. 14-18, 2022, 6 pages.
Search Report received for corresponding United Kingdom Patent Application No. 2305532.0, dated Nov. 14, 2023, 4 pages.
"RRC Measurement report triggering and content", 3GPP TSG-RAN WG2 NR Ad Hoc, R2-1700541, Agenda: 3.3.1.1.1, Ericsson, Jan. 17-19, 2017, pp. 1-5.
"Discussion on Multi-Rx L1 measurements", 3GPP TSG-RAN WG4 Meeting #106-e-bis, R4-2304052, Agenda: 5.6.3.2, Nokia, Apr. 17-26, 2023, 10 pages.
Extended European Search Report received for corresponding European Patent Application No. 24161046.8, dated Aug. 5, 2024, 8 pages.

* cited by examiner

METHOD, APPARATUS AND COMPUTER PROGRAM FOR BEAM REPORTING

CROSS-REFERENCE TO RELATED APPLICATION

This application claims the benefit of GB Application No. 2305532.0, filed Apr. 14, 2023. The entire content of the above-referenced application is hereby incorporated by reference.

FIELD

The present application relates to a method, apparatus, system and computer program and in particular but not exclusively to triggering the reporting of beams related to transmission and reception points.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP). Other examples of communication system to which this invention apply might also be developed in the future.

SUMMARY

According to an aspect, there is provided an apparatus comprising means for receiving, from a network node, a group based measurement event configuration comprising information indicating one or more trigger conditions associated with at least one group of beams, wherein each of the at least one group of beams comprises one or more beams associated with a first transmit-receive point and/or a second transmit-receive point; performing one or more beam measurements for the beams comprised in the at least one group of beams; determining, based on the one or more beam measurements, that at least one of the one or more trigger conditions is satisfied for one or more beams within the at least one group of beams; and in response to the determining, sending, to the network node, measurement reporting comprising at least one of: the one or more beam measurements on the one or more beams for which the at least one trigger condition is satisfied; information identifying the at least one trigger condition that was satisfied; and/or information identifying the one or more beams for which the at least one trigger condition is satisfied.

The one or more beam measurements may comprise layer 3 reference signal received power measurements.

The first transmit-receive point and second transmit-receive point may be provided by the same cell or different cells.

The one or more trigger conditions may comprise one or more of: a measurement for a beam provided by a neighbour transmit-receive point becomes better than a threshold value; a measurement for a beam provided by the neighbour transmit-receive point become worse than threshold; a measurement for a beam provided by a serving transmit-receive point becomes worse than a threshold; and a measurement for a beam provided by the neighbour transmit-receive point becomes an offset better than a beam provided by the serving transmit-receive point.

The serving transmit-receive point may comprise the first transmit-receive point and the neighbour transmit-receive point may comprise the second transmit-receive point.

A cell of the first transmit-receive point and a cell of the second transmit-receive point may be on the same carrier or different carriers.

The means may be further for: receiving, from the network node, a measurement configuration for causing the user equipment to perform one or more further measurements on at least the beam for which the at least one of the one or more trigger conditions is satisfied; and sending, to the network node, further measurement reporting comprising the one or more further measurements.

The one or more further measurements may be associated with simultaneous reception of the beam for which the at least one of the one or more trigger conditions is satisfied and at least one further beam.

The one or more further measurements may comprise layer 1 reference signal received power measurements.

According to an aspect, there is provided an apparatus comprising means for: sending, to a user equipment, a group based measurement event configuration comprising information indicating one or more trigger conditions associated with at least one group of beams, wherein each of the at least one group of beams comprises one or more beams provided by a first transmit-receive point and/or a second transmit-receive point; and receiving, from the user equipment, measurement reporting comprising at least one of: one or more beam measurements on one or more beams for which at least one trigger condition of the one or more trigger conditions is satisfied; information identifying the at least one trigger condition that was satisfied; and/or information identifying the one or more beams for which the at least one trigger condition is satisfied.

The one or more beam measurements may comprise layer 3 reference signal received power measurements The first transmit-receive point and second transmit-receive point may be provided by the same cell or different cells.

The one or more trigger conditions may comprise one or more of: a measurement for a beam provided by a neighbour transmit-receive point becomes better than a threshold value; a measurement for a beam provided by the neighbour transmit-receive point become worse than threshold; a measurement for a beam provided by a serving transmit-receive point becomes worse than a threshold; and a measurement for a beam provided by the neighbour transmit-receive point becomes an offset better than a beam provided by the serving transmit-receive point.

The serving transmit-receive point may comprise the first transmit-receive point and the neighbour transmit-receive point may comprise the second transmit-receive point.

A cell of the first transmit-receive point and a cell of the second transmit-receive point may be on the same carrier or different carriers.

The means may be further for: determining, based on the measurement reporting, a measurement configuration for causing the user equipment to perform one or more further measurements on at least the beam for which the at least one of the one or more trigger conditions is satisfied; sending, to the user equipment, the measurement configuration; and receiving, from the user equipment, further measurement reporting comprising the one or more further measurements.

The one or more further measurements may be associated with simultaneous reception by the user equipment of the beam for which the at least one of the one or more trigger conditions is satisfied and at least one further beam.

The one or more further measurements may comprise layer 1 reference signal received power measurements.

According to an aspect, there is provided an apparatus comprising at least one processor and at least one memory storing instructions that, when executed by the at least one processor, cause the apparatus at least to: receive, from a network node, a group based measurement event configuration comprising information indicating one or more trigger conditions associated with at least one group of beams, wherein each of the at least one group of beams comprises one or more beams associated with a first transmit-receive point and/or a second transmit-receive point; perform one or more beam measurements for the beams comprised in the at least one group of beams; determine, based on the one or more beam measurements, that at least one of the one or more trigger conditions is satisfied for one or more beams within the at least one group of beams; and in response to the determining, send, to the network node, measurement reporting comprising at least one of: the one or more beam measurements on the one or more beams for which the at least one trigger condition is satisfied; information identifying the at least one trigger condition that was satisfied; and/or information identifying the one or more beams for which the at least one trigger condition is satisfied.

The one or more beam measurements may comprise layer 3 reference signal received power measurements.

The first transmit-receive point and second transmit-receive point may be provided by the same cell or different cells.

The one or more trigger conditions may comprise one or more of: a measurement for a beam provided by a neighbour transmit-receive point becomes better than a threshold value; a measurement for a beam provided by the neighbour transmit-receive point become worse than threshold; a measurement for a beam provided by a serving transmit-receive point becomes worse than a threshold; and a measurement for a beam provided by the neighbour transmit-receive point becomes an offset better than a beam provided by the serving transmit-receive point.

The serving transmit-receive point may comprise the first transmit-receive point and the neighbour transmit-receive point may comprise the second transmit-receive point.

A cell of the first transmit-receive point and a cell of the second transmit-receive point may be on the same carrier or different carriers.

The at least one processor may be further configured to cause the apparatus to: receive, from the network node, a measurement configuration for causing the user equipment to perform one or more further measurements on at least the beam for which the at least one of the one or more trigger conditions is satisfied; and send, to the network node, further measurement reporting comprising the one or more further measurements.

The one or more further measurements may be associated with simultaneous reception of the beam for which the at least one of the one or more trigger conditions is satisfied and at least one further beam.

The one or more further measurements may comprise layer 1 reference signal received power measurements.

According to an aspect, there is provided an apparatus comprising at least one processor and at least one memory storing instructions that, when executed by the at least one processor, cause the apparatus at least to: send, to a user equipment, a group based measurement event configuration comprising information indicating one or more trigger conditions associated with at least one group of beams, wherein each of the at least one group of beams comprises one or more beams provided by a first transmit-receive point and/or a second transmit-receive point; and receive, from the user equipment, measurement reporting comprising at least one of: one or more beam measurements on one or more beams for which at least one trigger condition of the one or more trigger conditions is satisfied; information identifying the at least one trigger condition that was satisfied; and/or information identifying the one or more beams for which the at least one trigger condition is satisfied.

The one or more beam measurements may comprise layer 3 reference signal received power measurements The first transmit-receive point and second transmit-receive point may be provided by the same cell or different cells.

The one or more trigger conditions may comprise one or more of: a measurement for a beam provided by a neighbour transmit-receive point becomes better than a threshold value; a measurement for a beam provided by the neighbour transmit-receive point become worse than threshold; a measurement for a beam provided by a serving transmit-receive point becomes worse than a threshold; and a measurement for a beam provided by the neighbour transmit-receive point becomes an offset better than a beam provided by the serving transmit-receive point.

The serving transmit-receive point may comprise the first transmit-receive point and the neighbour transmit-receive point may comprise the second transmit-receive point.

A cell of the first transmit-receive point and a cell of the second transmit-receive point may be on the same carrier or different carriers.

The at least one processor may be further configured to cause the apparatus to: determine, based on the measurement reporting, a measurement configuration for causing the user equipment to perform one or more further measurements on at least the beam for which the at least one of the one or more trigger conditions is satisfied; send, to the user equipment, the measurement configuration; and receive, from the user equipment, further measurement reporting comprising the one or more further measurements.

The one or more further measurements may be associated with simultaneous reception by the user equipment of the beam for which the at least one of the one or more trigger conditions is satisfied and at least one further beam.

The one or more further measurements may comprise layer 1 reference signal received power measurements.

According to an aspect, there is provided a method comprising: receiving, from a network node, a group based measurement event configuration comprising information indicating one or more trigger conditions associated with at least one group of beams, wherein each of the at least one group of beams comprises one or more beams associated with a first transmit-receive point and/or a second transmit-receive point; performing one or more beam measurements for the beams comprised in the at least one group of beams; determining, based on the one or more beam measurements, that at least one of the one or more trigger conditions is satisfied for one or more beams within the at least one group of beams; and in response to the determining, sending, to the network node, measurement reporting comprising at least one of: the one or more beam measurements on the one or more beams for which the at least one trigger condition is satisfied; information identifying the at least one trigger condition that was satisfied; and/or information identifying the one or more beams for which the at least one trigger condition is satisfied.

The one or more beam measurements may comprise layer 3 reference signal received power measurements.

The first transmit-receive point and second transmit-receive point may be provided by the same cell or different cells.

The one or more trigger conditions may comprise one or more of: a measurement for a beam provided by a neighbour transmit-receive point becomes better than a threshold value; a measurement for a beam provided by the neighbour transmit-receive point become worse than threshold; a measurement for a beam provided by a serving transmit-receive point becomes worse than a threshold; and a measurement for a beam provided by the neighbour transmit-receive point becomes an offset better than a beam provided by the serving transmit-receive point.

The serving transmit-receive point may comprise the first transmit-receive point and the neighbour transmit-receive point may comprise the second transmit-receive point.

A cell of the first transmit-receive point and a cell of the second transmit-receive point may be on the same carrier or different carriers.

The method may comprise: receiving, from the network node, a measurement configuration for causing the user equipment to perform one or more further measurements on at least the beam for which the at least one of the one or more trigger conditions is satisfied; and sending, to the network node, further measurement reporting comprising the one or more further measurements.

The one or more further measurements may be associated with simultaneous reception of the beam for which the at least one of the one or more trigger conditions is satisfied and at least one further beam.

The one or more further measurements may comprise layer 1 reference signal received power measurements.

According to an aspect, there is provided a method comprising: sending, to a user equipment, a group based measurement event configuration comprising information indicating one or more trigger conditions associated with at least one group of beams, wherein each of the at least one group of beams comprises one or more beams provided by a first transmit-receive point and/or a second transmit-receive point; and receiving, from the user equipment, measurement reporting comprising at least one of: one or more beam measurements on one or more beams for which at least one trigger condition of the one or more trigger conditions is satisfied; information identifying the at least one trigger condition that was satisfied; and/or information identifying the one or more beams for which the at least one trigger condition is satisfied.

The one or more beam measurements may comprise layer 3 reference signal received power measurements The first transmit-receive point and second transmit-receive point may be provided by the same cell or different cells.

The one or more trigger conditions may comprise one or more of: a measurement for a beam provided by a neighbour transmit-receive point becomes better than a threshold value; a measurement for a beam provided by the neighbour transmit-receive point become worse than threshold; a measurement for a beam provided by a serving transmit-receive point becomes worse than a threshold; and a measurement for a beam provided by the neighbour transmit-receive point becomes an offset better than a beam provided by the serving transmit-receive point.

The serving transmit-receive point may comprise the first transmit-receive point and the neighbour transmit-receive point may comprise the second transmit-receive point.

A cell of the first transmit-receive point and a cell of the second transmit-receive point may be on the same carrier or different carriers.

The method may comprise: determining, based on the measurement reporting, a measurement configuration for causing the user equipment to perform one or more further measurements on at least the beam for which the at least one of the one or more trigger conditions is satisfied; sending, to the user equipment, the measurement configuration; and receiving, from the user equipment, further measurement reporting comprising the one or more further measurements.

The one or more further measurements may be associated with simultaneous reception by the user equipment of the beam for which the at least one of the one or more trigger conditions is satisfied and at least one further beam.

The one or more further measurements may comprise layer 1 reference signal received power measurements.

According to an aspect, there is provided a computer readable medium comprising instructions which, when executed by an apparatus, cause the apparatus to perform at least the following: receiving, from a network node, a group based measurement event configuration comprising information indicating one or more trigger conditions associated with at least one group of beams, wherein each of the at least one group of beams comprises one or more beams associated with a first transmit-receive point and/or a second transmit-receive point; performing one or more beam measurements for the beams comprised in the at least one group of beams; determining, based on the one or more beam measurements, that at least one of the one or more trigger conditions is satisfied for one or more beams within the at least one group of beams; and in response to the determining, sending, to the network node, measurement reporting comprising at least one of: the one or more beam measurements on the one or more beams for which the at least one trigger condition is satisfied; information identifying the at least one trigger condition that was satisfied; and/or information identifying the one or more beams for which the at least one trigger condition is satisfied.

The one or more beam measurements may comprise layer 3 reference signal received power measurements.

The first transmit-receive point and second transmit-receive point may be provided by the same cell or different cells.

The one or more trigger conditions may comprise one or more of: a measurement for a beam provided by a neighbour transmit-receive point becomes better than a threshold value; a measurement for a beam provided by the neighbour transmit-receive point become worse than threshold; a measurement for a beam provided by a serving transmit-receive point becomes worse than a threshold; and a measurement for a beam provided by the neighbour transmit-receive point becomes an offset better than a beam provided by the serving transmit-receive point.

The serving transmit-receive point may comprise the first transmit-receive point and the neighbour transmit-receive point may comprise the second transmit-receive point.

A cell of the first transmit-receive point and a cell of the second transmit-receive point may be on the same carrier or different carriers.

The instructions, when executed by the apparatus, may cause the apparatus to further perform: receiving, from the network node, a measurement configuration for causing the user equipment to perform one or more further measurements on at least the beam for which the at least one of the one or more trigger conditions is satisfied; and sending, to the network node, further measurement reporting comprising the one or more further measurements.

The one or more further measurements may be associated with simultaneous reception of the beam for which the at least one of the one or more trigger conditions is satisfied and at least one further beam.

The one or more further measurements may comprise layer 1 reference signal received power measurements.

According to an aspect, there is provided a computer readable medium comprising instructions which, when executed by an apparatus, cause the apparatus to perform at least the following: sending, to a user equipment, a group based measurement event configuration comprising information indicating one or more trigger conditions associated with at least one group of beams, wherein each of the at least one group of beams comprises one or more beams provided by a first transmit-receive point and/or a second transmit-receive point; and receiving, from the user equipment, measurement reporting comprising at least one of: one or more beam measurements on one or more beams for which at least one trigger condition of the one or more trigger conditions is satisfied; information identifying the at least one trigger condition that was satisfied; and/or information identifying the one or more beams for which the at least one trigger condition is satisfied.

The one or more beam measurements may comprise layer 3 reference signal received power measurements The first transmit-receive point and second transmit-receive point may be provided by the same cell or different cells.

The one or more trigger conditions may comprise one or more of: a measurement for a beam provided by a neighbour transmit-receive point becomes better than a threshold value; a measurement for a beam provided by the neighbour transmit-receive point become worse than threshold; a measurement for a beam provided by a serving transmit-receive point becomes worse than a threshold; and a measurement for a beam provided by the neighbour transmit-receive point becomes an offset better than a beam provided by the serving transmit-receive point.

The serving transmit-receive point may comprise the first transmit-receive point and the neighbour transmit-receive point may comprise the second transmit-receive point.

A cell of the first transmit-receive point and a cell of the second transmit-receive point may be on the same carrier or different carriers.

The instructions, when executed by the at least one processor, may cause the apparatus to further perform: determining, based on the measurement reporting, a measurement configuration for causing the user equipment to perform one or more further measurements on at least the beam for which the at least one of the one or more trigger conditions is satisfied; sending, to the user equipment, the measurement configuration; and receiving, from the user equipment, further measurement reporting comprising the one or more further measurements.

The one or more further measurements may be associated with simultaneous reception by the user equipment of the beam for which the at least one of the one or more trigger conditions is satisfied and at least one further beam.

The one or more further measurements may comprise layer 1 reference signal received power measurements.

According to an aspect, there is provided a non-transitory computer readable medium comprising program instructions that, when executed by an apparatus, cause the apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

A non-exhaustive list of some abbreviations used in the present disclosure is provided below for reference:

UE user equipment
TRP transmit/reception point
GBBR group based beam reporting
DL downlink
UL uplink
MultiRx Multi reception (UE capable of reception from two not collocated sources/TRPs)
RSRP reference signal received power
RSRQ reference signal received quality
SINR signal to interference noise ratio
SSB synchronisation signal block
DCI downlink control information
TCI transmission configuration indicator
QCL quasi collocated
RX reception
TX transmission
PCell primary cell
SCell secondary cell
FR2 frequency range 2
CSI channel state information
PCI physical cell identity In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
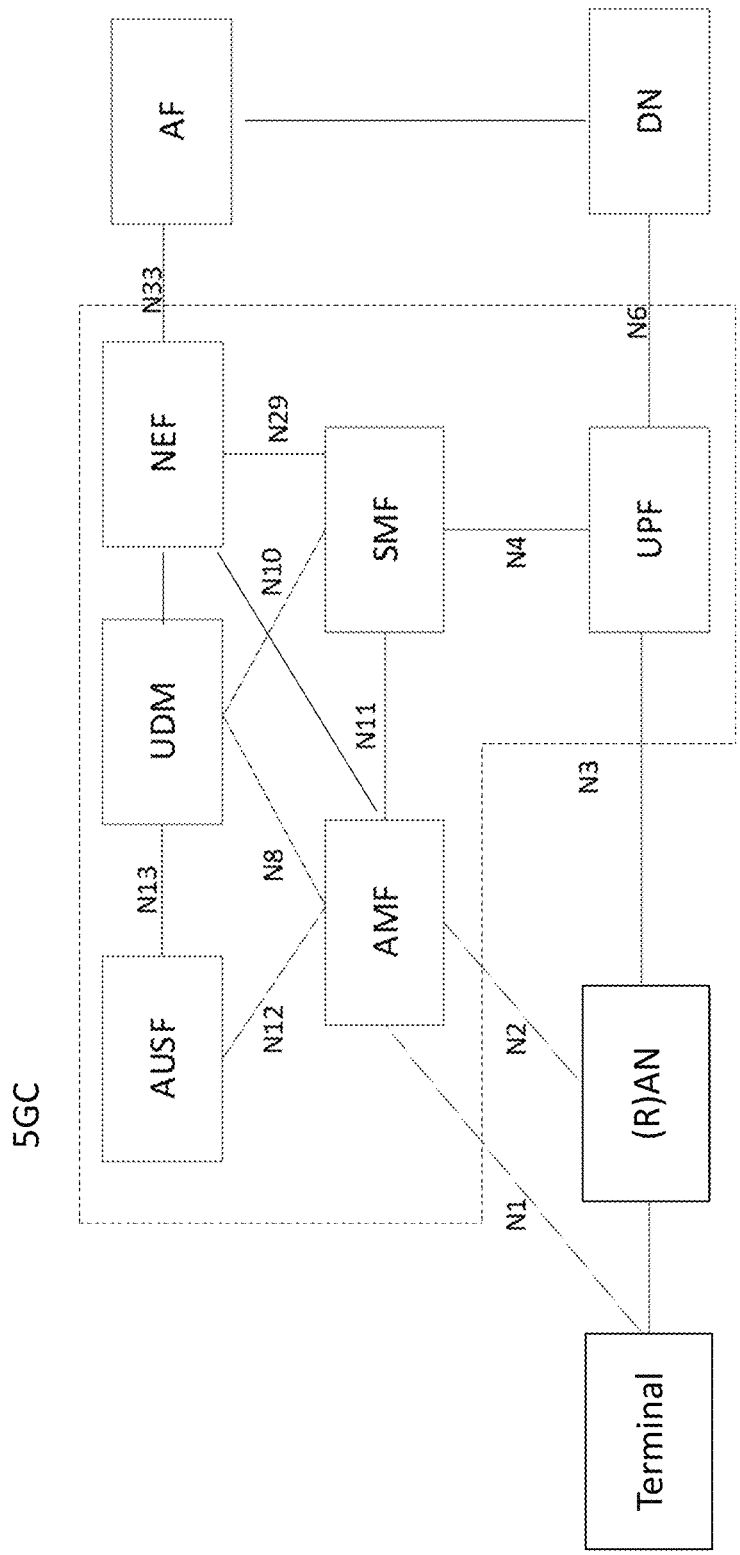
FIG. 1 shows a representation of a network system according to some example embodiments.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions. The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF). FIG. 1 also shows the various interfaces (N1, N2 etc.) that may be implemented between the various elements of the system.

Figure 2:
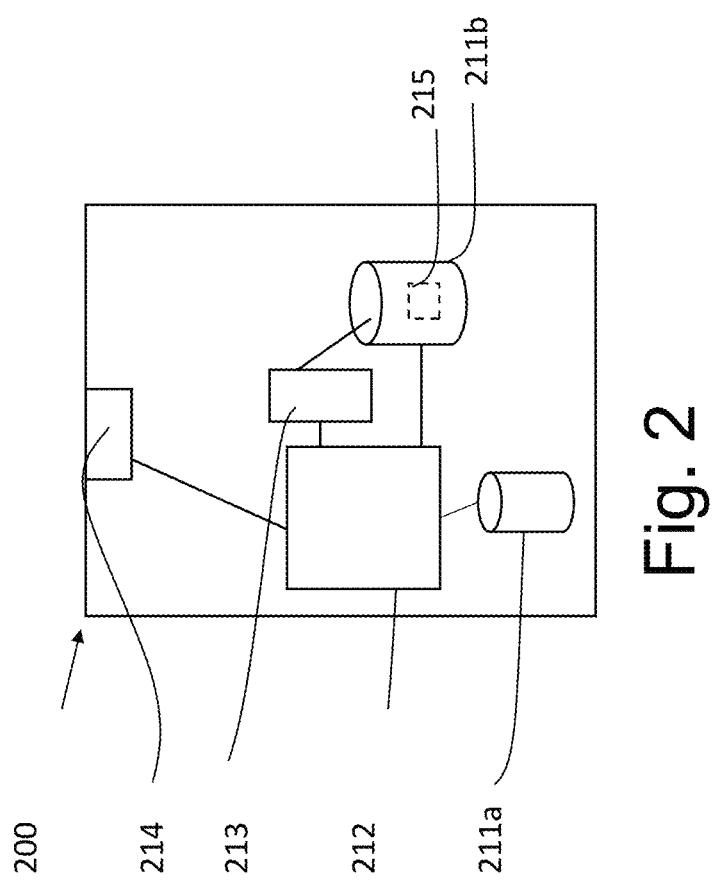
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
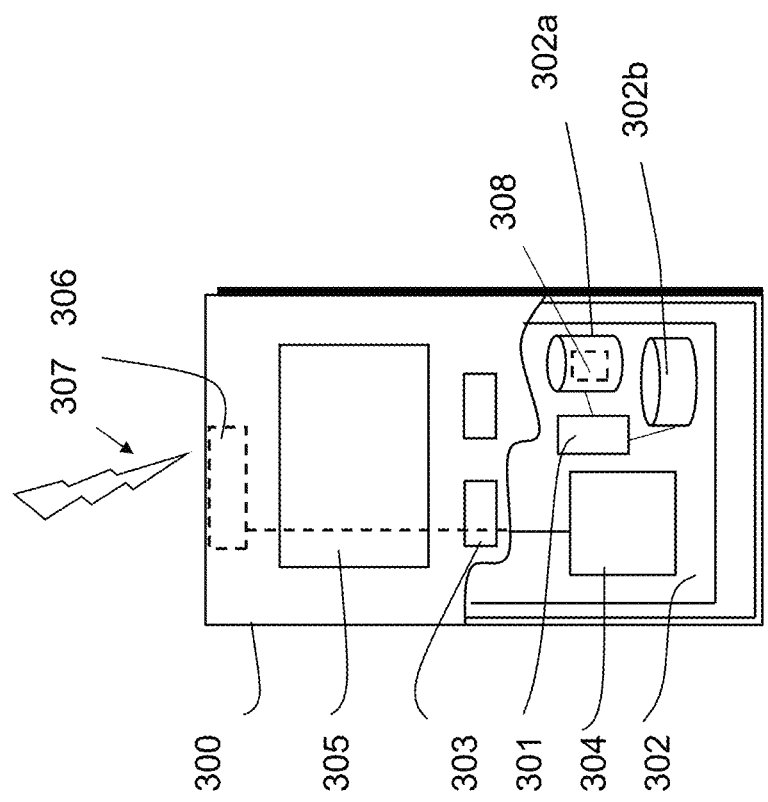
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Some UEs may be capable of performing simultaneous reception from two or more transmission-reception points (TRPs). Such capability may be referred to as multi-reception, or MultiRx herein. Examples of a TRP may include, but are not limited to, a network device that the UE can communicate with, such as an access node (e.g. gNB), or radio unit (RU) or similar device.

One way to realize multiRx on UE side is by having UE to perform beam measurements (e.g. layer 1 reference signal received power (L1-RSRP) measurements) from TRPs that the UE can receive simultaneously, and report the beam measurements to the network. In some examples, beam measurement reporting may be supported for inter-TRP beam pairing to indicate which pair of DL RS (and thereby TRPs) can be used to perform simultaneous RX.

One reporting method which may be used for facilitating beam measurement reporting is the Group Based Beam Reporting (GBBR).

In Group Based Beam Reporting, the UE may indicate in a report N pairs/groups of beams and M beams per group/pair that can be received simultaneously be the UE. In some examples, N>1 and M>1. In some examples, N(max)=[1; 4].

For example, consider a scenario where a first TRP, TRP1 provides reference signals (e.g. SSB) via beam 1 and beam 2, and a second TRP, TRP2, provides reference signals (e.g. SSB) via beam 3 and beam 4. A UE comprising three antennas A1, A2, A3 is capable of receiving simultaneously from more than one Rx antenna simultaneously for example two of the three antennas. Alternatively, the UE may be able to receive simultaneously from more than one non-collocated source. The UE may receive SSB1 from beam 1 via A1, SSB2 from beam 2 and SSB3 from beam 3 via A2, and SSB4 from beam 4 via A3. In such a scenario, the UE may be able to form the following beam group/pairs:

| | |
|---|---|
| Pair 1 | Beam 1 + Beam 3 |
| Pair 2 | Beam 2 + Beam 4 |
| Pair 3 | Beam 1 + Beam 4 |
| Pair 4 | Beam 1 + Beam 2 |
| Pair 5 | Beam 3 + Beam 4 |

In this example, where N(max)=4, the UE may generate the following GBBR, assuming the reference signal representing the beams is SSB:

| | |
|---|---|
| Pair 1 | SSB1 + SSB3 |
| Pair 2 | SSB2 + SSB4 |
| Pair 3 | SSB1 + SSB4 |
| Pair 4 | SSB1 + SSB2 |

It should be understood that in some examples, the beam may be identified or referenced by other reference signal than SSB, for example CSI-RS.

To enable configuration of GBBR, the UE may provide some assistance information to the network, for example in terms of layer 3 (L3) measurements. Based on the assistance information received from the UE, the network may be aware of which reference signals, e.g. SSB, the UE has detected and measured—and hence, which reference signals may be possible candidates for being configured for GBBR or source indicators for a GBBR configuration.

In some examples, the network may configure the UE to perform GBBR based on the assistance information received from the UE. For example, the network may send, to the UE, GBBR configuration information. In some examples, the network may only configure the UE to perform GBBR for a given reference signal if measurement information for the same reference signal is comprised in the assistance information. In some examples, the assistance information may be required to be received by the network within a certain amount of time (e.g. 5 seconds), or within a QCL chain of a reported RS.

Based on the GBBR configuration information, the UE may perform further measurements (e.g. L1-RSRP) and report the further measurements from pairs of beams that the UE can receive simultaneously. The network may then configure the UE to receive from beams provided by both TRPs based on the reported measurements (e.g. L1-RSRP measurements).

Thus, in some examples, the UE may send assistance information comprising measurement information (such as L3 measurements) as an initial step for the setup of a connection for simultaneous reception of data in DL.

One challenge with such examples is how to efficiently deliver the assistance information to the network and how such delivery is triggered.

Some reporting events that may help the network to configure the UE to trigger reports as the UE conditions change (for example due to UE mobility) have already been specified in TS 38.331. Examples include:

Event A1 (Serving becomes better than threshold)
Event A2 (Serving becomes worse than threshold)
Event A3 (Neighbour becomes offset better than SpCell)
Event A4 (Neighbour becomes better than threshold)
Event A5 (SpCell becomes worse than threshold1 and neighbour becomes better than threshold2)
Event A6 (Neighbour becomes offset better than SCell)

From the list of events above, it can be observed that events specified in TS 38.331 may depend on the RSRP, RSRQ or SINR for the Serving Cell, Neighbour cell, SpCell, or SCell. In all cases there may be no distinction for events that considers how the level of the reference signals from the same cell are changing.

According to some current 3GPP specifications, the network can only define UE measurement events per cell. Hence, if the network needs the UE to report which TRP may be considered for UE MultiRx from different TRPs, the network may configure the UE to:

Use event A1 and report the assistance information when any SSB RSRP is higher than threshold; and/or
Use periodic reporting and have UE to report periodically assistance information.

However, although this reporting mechanism may be possible to facilitate reporting the UE assistance information to the network, it may not be efficient.

Figure 4:
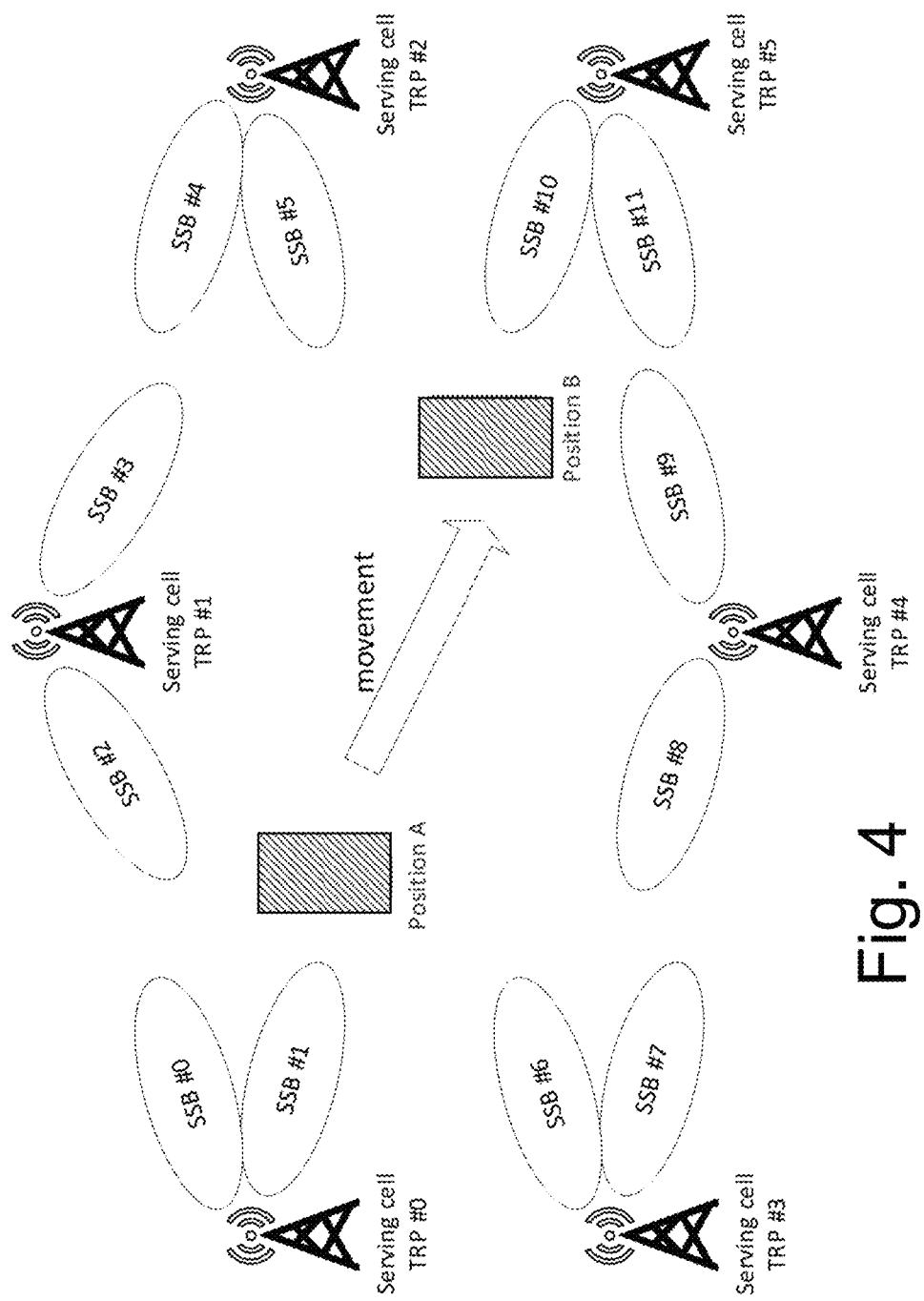
FIG. 4 depicts an example scenario showing how some existing mobility events may be insufficient.

For example, FIG. 4 depicts an example scenario showing how some existing mobility events may be insufficient for reporting the assistance information.

In this scenario multiple TRPs, TRP #0-5, belong to the same physical cell and so have the same PCI. If the assistance information comprises L3 measurements for the pre-selection of TRPs, the existing mobility events may provide no support for triggering measurement reports considering changes in RSRP among TRPs, because the PCI does not change between TRPs.

If L3 measurements are to be used for pre-selection of TRPs before group-based beam reporting is configured, it may be desired that the network has opportunity to configure L3 reports for all the TRPs which will be configured for GBBR.

In the example of FIG. 4, considering the mobility event A1, there may be no difference in the RSRP for the serving cell if the RSRP measured for SSB #1 from TRP #0 is reduced in comparison to an increase in the RSRP measured for SSB #5 from TRP #2, for example as the UE moves in the direction of TRP #2 from Position A to Position B. When the UE is in Position A, the network may require L3 measurements for at least TRP #0, TRP #1, and TRP #3, whereas when the UE is in Position B the network may require L3 measurements for TRP #2, TRP #4, and TRP #5.

Since the RSRP of the serving cell may not have changed when moving from Position A to Position B, there may be no way to trigger a report based on the TRPs which may be candidates for GBBR configuration. In one example if RSRP from SSB #0 at position A is the same as RSRP from SSB #10 at position B, the Serving Cell RSRP is still the same. Hence, the reporting from UE may be inefficient and event A1 or other mobility events relying on the Serving cell RSRP may either not be triggered or triggered unnecessarily.

These issues may apply in both intra-cell multiple TRP (mTRP) scenario and inter-cell (mTRP) scenarios and for both intra-frequency and inter-frequency scenarios.

Some examples may therefore address the issue of how the network may enable timely UE triggering of assistance information (e.g. L3 reports) for the network to perform TRP selection for GBBR for multiple TRPs, which may or may not share the same PCI.

Figure 5A:
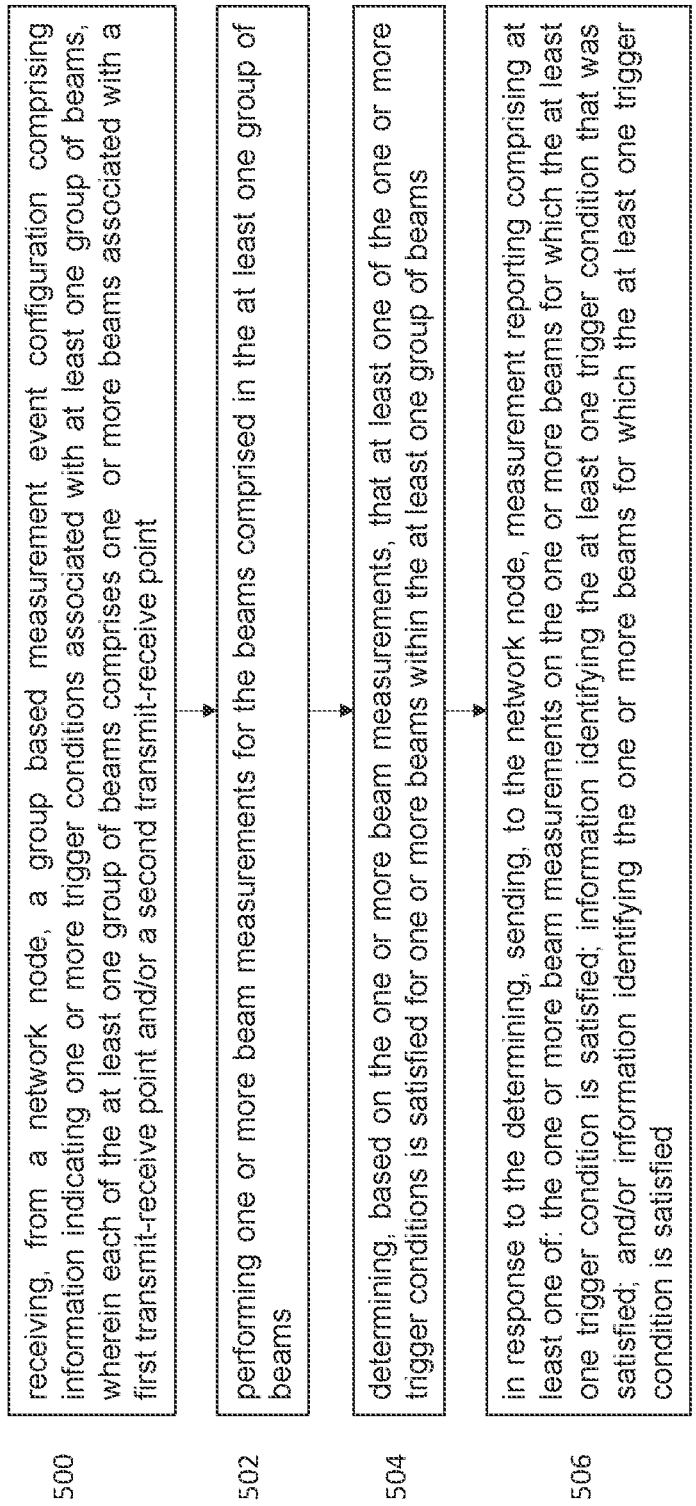
FIG. 5A and FIG. 5B show methods according to some examples.
Figure 5B:
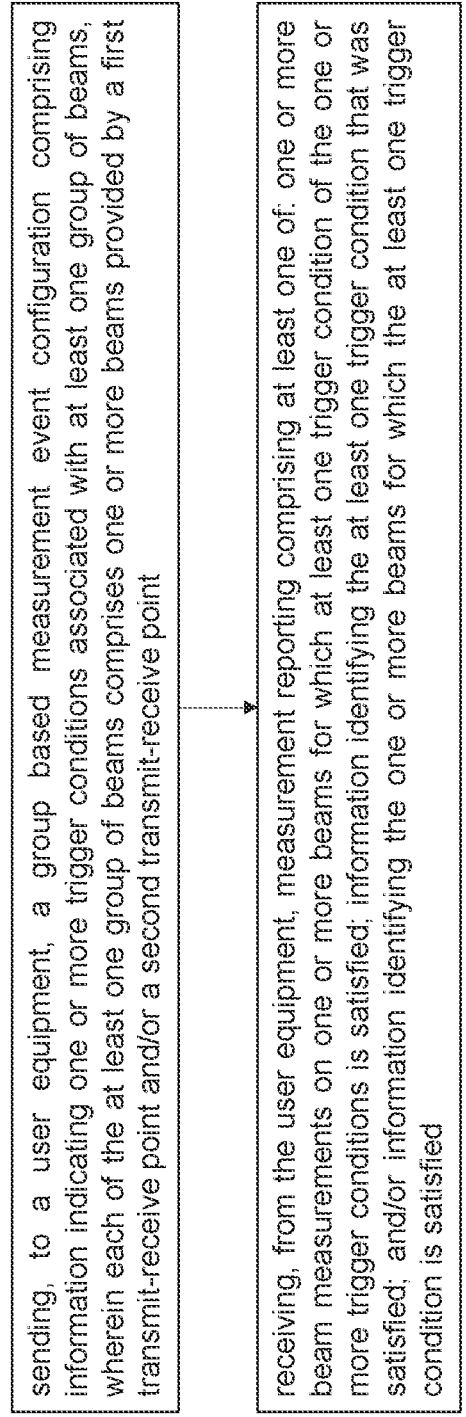

Reference is made to FIG. 5A and FIG. 5B, which show methods according to some examples. FIG. 5A shows a method that in some examples may be performed by a UE. FIG. 5B shows a method that in some examples may be performed by a network node.

With reference to FIG. 5A, at 500 the method comprises receiving, from a network node, a group based measurement event configuration comprising information indicating one or more trigger conditions associated with at least one group of beams, wherein each of the at least one group of beams comprises one or more beams associated with a first transmit-receive point and/or a second transmit-receive point.

At 502 the method comprises performing one or more beam measurements for the beams comprised in the at least one group of beams.

At 504 the method comprises determining, based on the one or more beam measurements, that at least one of the one or more trigger conditions is satisfied for one or more beams within the at least one group of beams.

At 506 the method comprises, in response to the determining, sending, to the network node, measurement reporting comprising at least one of: the one or more beam measurements on the one or more beams for which the at least one trigger condition is satisfied; information identifying the at least one trigger condition that was satisfied; and/or information identifying the one or more beams for which the at least one trigger condition is satisfied.

With reference to FIG. 5B, at 508 the method comprises sending, to a user equipment, a group based measurement event configuration comprising information indicating one or more trigger conditions associated with at least one group of beams, wherein each of the at least one group of beams comprises one or more beams provided by a first transmit-receive point and/or a second transmit-receive point.

At 510 the method comprises receiving, from the user equipment, measurement reporting comprising at least one of: one or more beam measurements on one or more beams for which at least one trigger condition of the one or more trigger conditions is satisfied; information identifying the at least one trigger condition that was satisfied; and/or information identifying the one or more beams for which the at least one trigger condition is satisfied.

In some examples, methods are provided that may enhance the UE measurement reporting, for example for assisting Group Based Beam Reporting. Some examples may define a measurement configuration (termed group based measurement event configuration herein) which may enable UE measurement events being configured for a group of RS (e.g. SSBs) or set of RS (e.g. a set of SSBs) among all RSs used. In some examples a group may comprise one or more DL RS/beams In some examples the group based measurement event configuration may be configured for one or more DL RS, for example SSBs and/or CSI-RS, of the serving cell and hence may address reporting events for groups of SSBs within the serving cell, or may be for group(s) of one or more DL RS, for example SSBs and/or CSI-RS, also from any neighbour cell. In some examples, the serving cell and/or neighbour cell may have several TRPs. The neighbour cell may be either on same carrier as the serving cell (intra-frequency carrier) or being on another carrier (inter-frequency carrier).

In some examples the grouping of SSBs may indicate the TRPs which could be used as TRPs in a multiRx reception configuration setup. In some examples, one or more TRPs may have one or more groups of SSBs, which may indicate that a given area is covered by the TRP.

The group based measurement event configuration may enable event triggered reporting (or periodic event triggered or reporting in general) for one or more groups of DL RS, for example SSBs, among the used SSBs within a cell or layer (carrier).

Figure 6:
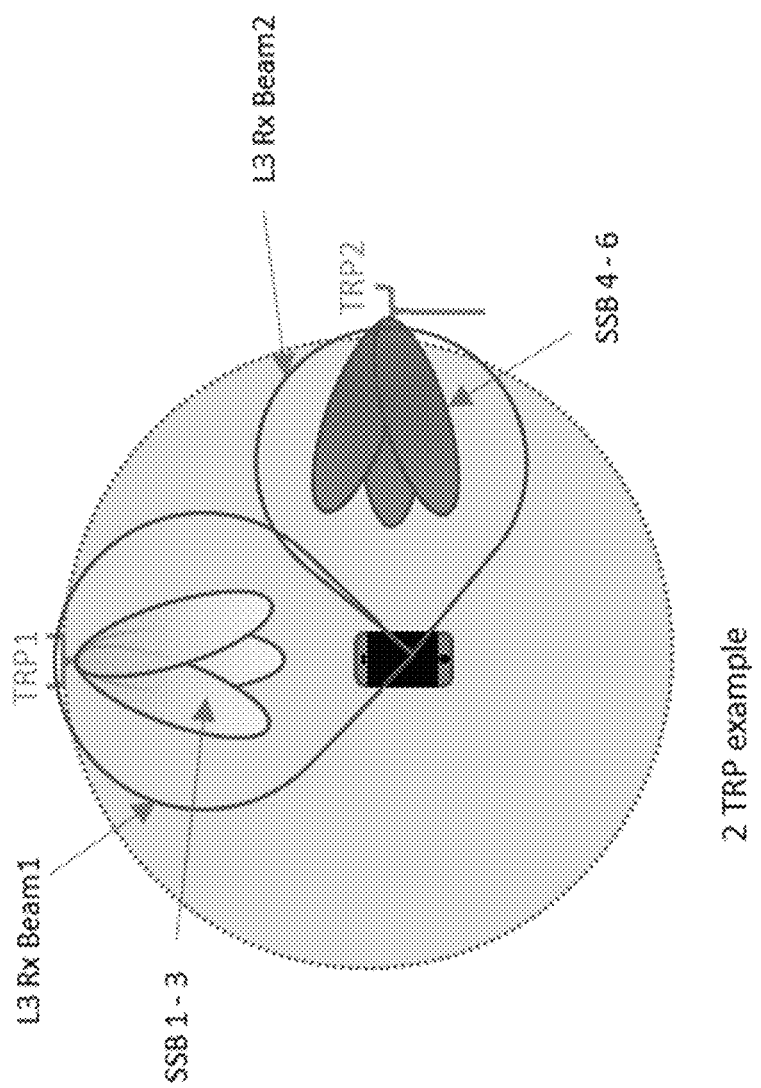
FIG. 6 illustrates an example scenario including a user equipment and two transmit-receive points.

Reference is made to FIG. 6, which illustrates an example scenario including a UE and two TRPs, TRP1 and TRP2. Each TRP has 3 beams (SSB1-3 for TRP1 and SSB4-6 for TRP2). In the example of FIG. 6, the UE has an active UL/DL data session ongoing using TRP1 and for example SSB2 as source DL RS and TCI state (referred to as TCI1). The UE may regularly perform measurements (e.g. L3 measurements) in this example using wide beam (rough) settings and may during this process detect and measure also SSB 4-6 transmitted by TRP2, beside potentially SSB 1 and 3 transmitted from TRP1, once the conditions for detection and measurements are fulfilled.

Based on the measurement configuration, once an SSB transmitted by TRP 2 become better than the given threshold, the UE may trigger a measurement report.

Figure 7:
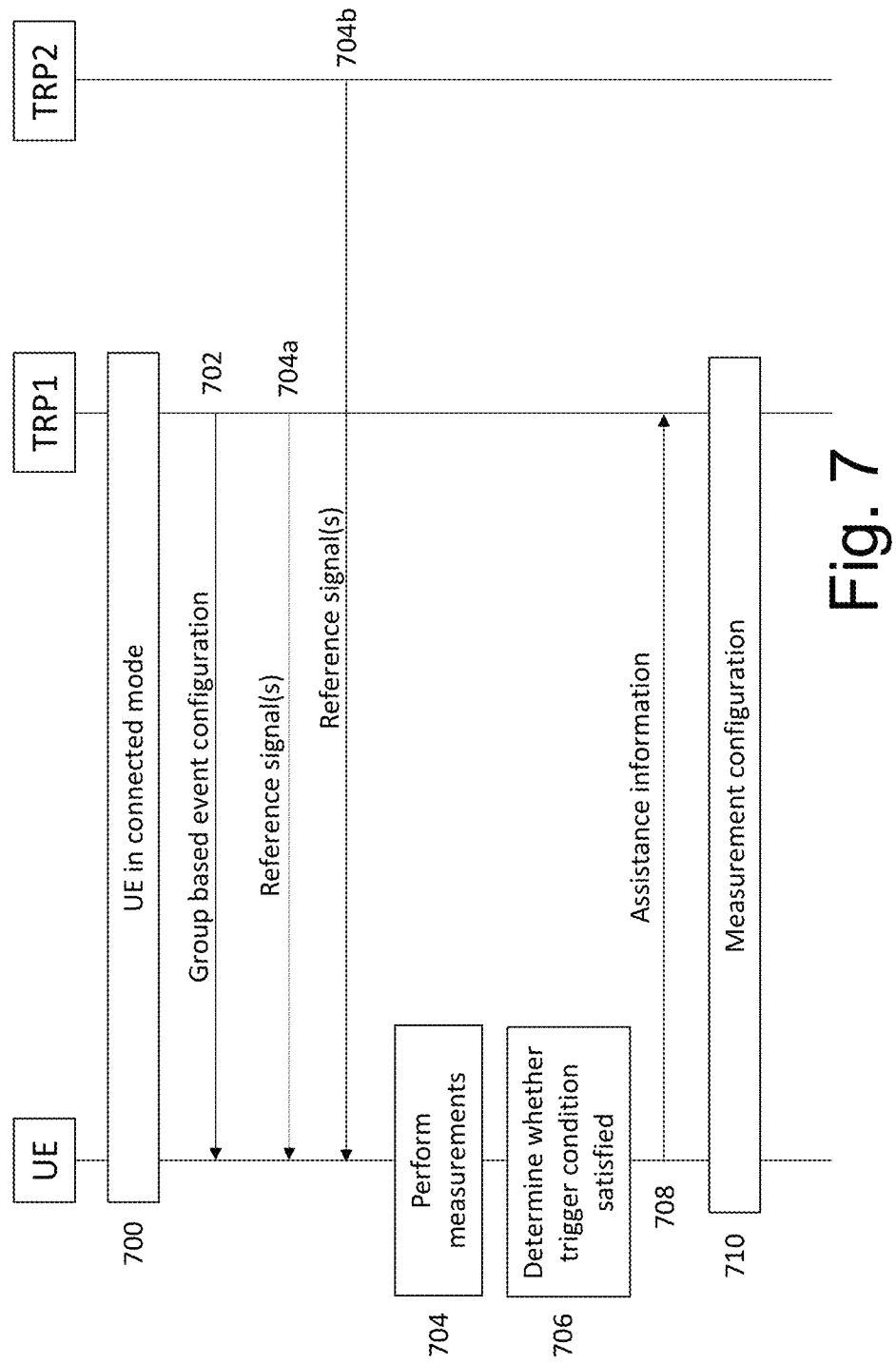
FIG. 7 shows a signalling exchange according to some examples.

Reference is made to FIG. 7, which shows a signalling exchange according to some examples. The signalling exchange may be applied to situations where the UE is operating in Connected mode and network deployment is such that the network supports mTRP operation and UE supports multi-Rx reception in higher frequencies (hence, UE supports reception from more than 1 non-collocated source (which could be a TRP)), such as the example scenario depicted in FIG. 6.

While some examples are described using NR FR2 as example deployment assumption, it should be understood that the methods of these examples can be applied also in other deployments and other radio technologies, such as 6G.

At 700, the UE is in connected mode with an active connection to a serving cell consisting of a first TRP, TRP1. In some examples, TRP1 may act as an anchor TRP (i.e. where control information is exchanged). However in other examples the anchor TRP may be a different TRP, i.e. TRP1 may not be the anchor TRP. There is also a second TRP, TRP2. TRP1 and TRP2 are assumed not to be collocated from the UE's perspective.

At 702, a network node sends a group based measurement event configuration to the UE. For example, the network node may send the UE a RRC Reconfiguration message comprising the group based measurement event configuration. In some examples, the network node may comprise the first TRP. In other examples the network node may comprise one TRP other than the first or second TRP.

The group based measurement event configuration may comprise information indicating one or more trigger conditions associated with a group of beams (e.g. a group of one or more downlink reference signals, such as SSBs, CSI-RS or other reference signal, or a group of one or more beams). The group of beams may be a group of beams within all beams of a cell. The trigger condition(s), when fulfilled for one or more beams within the group of beams, may cause the UE to send a measurement report to the serving cell of the network (e.g. TRP1).

In the example of FIG. 7, the TRPs are from same cell (serving cell) on the same carrier. However, in another example the TRPs could be from different cells on the same carrier, or from cells on a different carrier than the serving cell.

For example, the trigger condition may be that a measurement (e.g. L3 measurement) for a beam from a Neighbour TRP (i.e. the second TRP) becomes better than a threshold value. The event may be based on SSB specific measurements or another DL RS.

A neighbour TRP may be understood as a TRP not currently serving the UE, e.g. there is no indicated or active TCI state or connection associated with that TRP. The TRP may be from the same cell as the serving cell or another cell. Here a serving TRP may be understood as a TRP which is currently serving the UE. In some examples, the serving TRP may be a TRP with either an indicated TCI state, or a TCI state within the current active TCI state list. Multiple TRPs may be used as serving TRPs simultaneously by the UE.

Other example trigger conditions include:
that a measurement for a beam from a Neighbour TRP become worse/better than threshold;
that a measurement for a beam from a serving TRP becomes worse/better than a threshold;
that a measurement for a beam from Neighbour TRP becomes an offset better/worse than the Serving TRP.

It should be understood that in some examples, trigger conditions other than those described above may be used.

At 704 the UE performs one or more measurements based on reference signals received from TRP1 and/or TRP2. For example, as shown by 704a, the UE may receive reference signals from TRP1—for example via SSB1, SSB2 and SSB3; and as shown by 704b, the UE may receive reference signals from TRP2—for example via SSB4, SSB5 and SSB6.

At 706, based on the performed measurement(s), the UE determines whether at least one of the one or more trigger conditions comprised in the group based measurement event configuration are met. For example, the UE may measure the RSRP for each beam from TRP2 and determine whether the measured RSRP is better than a threshold.

At 708, when the UE determines that at least one of the one or more trigger conditions are fulfilled, the UE sends, to the network node, assistance information. The assistance information may comprise at least one of: the measurement(s) performed at 704 on the beam(s) for which the trigger condition was satisfied; information identifying the trigger condition that was satisfied; and/or information identifying the beam(s) for which the trigger condition was satisfied.

At 710, based on the received assistance information, the network node may configure the UE with a measurement configuration for performing one or more further measurements (e.g. L1-RSRP measurements) on relevant target RSs to enable the UE to perform reporting to verify if the UE is able to receive simultaneously from the beam(s) that fulfilled the trigger condition at 706 and other beam. In some examples the measurement configuration may be a Group Based Beam Reporting configuration.

In some examples, the network node may determine, based on the assistance information, a measurement configuration for causing the user equipment to perform one or more further measurements (e.g. L1-RSRP measurements). The one or more further measurements may be associated with at least the beam for which the at least one of the one or more trigger conditions is satisfied. The network node may send, to the user equipment, the determined measurement configuration.

For example, if the UE determines at 706 that a trigger condition associated with SSB5 is fulfilled, then the UE may report this to the network node in the assistance information at 708, and the network node may configure the UE to perform reporting to determine if the UE can perform simultaneous reception using at least SSB5, other SSB indexes belonging to the same group, or other reference signals which are QCL-ed with SSB5.

The UE, upon receiving the measurement configuration from the network node, may obtain the one or more further measurements (e.g. L1 RSRP measurements) and send a measurement report to the network node based on the obtained measurements.

While some examples above have been described with reference to two TRPs, it should be understood that in other examples there may be more than two TRPs. For instance, in some examples there may be two serving TRPs and two neighbour TRPs. In general, there may be any number of serving and neighbour TRPs.

One non-limiting example of a triggering condition definition for inclusion in 3GPP specifications is provided below:

| Event M1 (Neighbour TRP SSB becomes better than threshold) |
|---|
| The UE shall:<br>   1> consider the entering condition for this event to be satisfied when condition M1-1, as specified below, is fulfilled;<br>   1> consider the leaving condition for this event to be satisfied when condition M1-2, as specified below, is fulfilled;<br>   1> for this measurement, for the given neighbour SSB, consider the NR Neighbour TRP SSB corresponding to the associated measObjectNR associated with this event.<br>  Inequality M1-1 (Entering condition)<br>    Ms − Hys > Thresh<br>  Inequality M1-2 (Leaving condition)<br>    Ms + Hys < Thresh<br>  The variables in the formula are defined as follows:<br>    Ms is the measurement result of the neighbour TRP, not taking into account any offsets.<br>    Hys is the hysteresis parameter for this event (i.e. hysteresis as defined within reportConfigNR for this event).<br>    Thresh is the threshold parameter for this event (i.e. m1-Threshold as defined within reportConfigNR for this event). |

Thus, in some examples a network node may configure the UE with a group based event configuration. The group based event configuration may comprise information indicating one or more trigger conditions associated with a group of beams (e.g. a group of SSBs). The trigger condition(s), when fulfilled for one or more beams within the group of beams, may cause the UE to send assistance information to the network node (e.g. TRP1). The network node may use the assistance information to configure the UE with a measurement configuration. The measurement configuration may cause the UE to perform measurement reporting (such as group based beam reporting) for measurements on relevant target RSs if the UE is able to receive simultaneously from the beam(s) that fulfil the trigger condition.

Therefore, in some examples the network may enable timely UE triggering of assistance information (e.g. L3 reports) for TRP selection for GBBR for multiple TRPs, regardless of whether the TRPs share the same PCI or not. While examples have been described with reference to the assistance information comprising L3 measurement reports, it should be understood that in some examples other information may included instead of or in addition to L3 measurement reports.

In some examples, the methods described above may be implemented by one or more apparatuses. For example, an apparatus may comprise means for: receiving, from a network node, a group based measurement event configuration comprising information indicating one or more trigger conditions associated with at least one group of beams, wherein each of the at least one group of beams comprises one or more beams associated with a first transmit-receive point and/or a second transmit-receive point; performing one or more beam measurements for the beams comprised in the at least one group of beams; determining, based on the one or more beam measurements, that at least one of the one or more trigger conditions is satisfied for one or more beams within the at least one group of beams; and in response to the determining, sending, to the network node, measurement reporting comprising at least one of: the one or more beam measurements on the one or more beams for which the at least one trigger condition is satisfied; information identifying the at least one trigger condition that was satisfied; and/or information identifying the one or more beams for which the at least one trigger condition is satisfied.

The apparatus may comprise at least one processor and at least one memory storing instructions that, when executed by the at least one processor, cause the apparatus at least to: receive, from a network node, a group based measurement event configuration comprising information indicating one or more trigger conditions associated with at least one group of beams, wherein each of the at least one group of beams comprises one or more beams associated with a first transmit-receive point and/or a second transmit-receive point; perform one or more beam measurements for the beams comprised in the at least one group of beams; determine, based on the one or more beam measurements, that at least one of the one or more trigger conditions is satisfied for one or more beams within the at least one group of beams; and in response to the determining, send, to the network node, measurement reporting comprising at least one of: the one or more beam measurements on the one or more beams for which the at least one trigger condition is satisfied; information identifying the at least one trigger condition that was satisfied; and/or information identifying the one or more beams for which the at least one trigger condition is satisfied.

In some examples, an apparatus may comprise means for: sending, to a user equipment, a group based measurement event configuration comprising information indicating one or more trigger conditions associated with at least one group of beams, wherein each of the at least one group of beams comprises one or more beams provided by a first transmit-receive point and/or a second transmit-receive point; and receiving, from the user equipment, measurement reporting comprising at least one of: one or more beam measurements on one or more beams for which at least one trigger condition of the one or more trigger conditions is satisfied; information identifying the at least one trigger condition that was satisfied; and/or information identifying the one or more beams for which the at least one trigger condition is satisfied.

The apparatus may comprise at least one processor and at least one memory storing instructions that, when executed by the at least one processor, cause the apparatus at least to: send, to a user equipment, a group based measurement event configuration comprising information indicating one or more trigger conditions associated with at least one group of beams, wherein each of the at least one group of beams comprises one or more beams provided by a first transmit-receive point and/or a second transmit-receive point; and receive, from the user equipment, measurement reporting comprising at least one of: one or more beam measurements on one or more beams for which at least one trigger condition of the one or more trigger conditions is satisfied; information identifying the at least one trigger condition that was satisfied; and/or information identifying the one or more beams for which the at least one trigger condition is satisfied.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising at least one processor and at least one memory storing instructions that, when executed by the at least one processor, cause the apparatus at least to perform:
   receiving, from a network node, a group-based measurement event configuration comprising information indicating one or more trigger conditions associated with at least one group of beams, wherein each of the at least one group of beams comprises one or more beams associated with at least one of a first transmit-receive point or a second transmit-receive point;
   performing one or more beam measurements for the beams comprised in the at least one group of beams;
   determining, based on the one or more beam measurements, that at least one of the one or more trigger conditions is satisfied for one or more beams within the at least one group of beams; and
   in response to the determining, sending, to the network node, measurement reporting comprising at least one of: the one or more beam measurements on the one or more beams for which the at least one trigger condition is satisfied; information identifying the at least one trigger condition that was satisfied; or information identifying the one or more beams for which the at least one trigger condition is satisfied.

2. The apparatus of claim 1, wherein the one or more beam measurements comprise layer 3 reference signal received power measurements.

3. The apparatus of claim 1, wherein the first transmit-receive point and second transmit-receive point are provided by a same cell or by different cells.

4. The apparatus of claim 1, wherein the one or more trigger conditions comprises one or more of:
   a measurement for a beam provided by a neighbour transmit-receive point becomes better than a threshold value;
   a measurement for a beam provided by the neighbour transmit-receive point become worse than a threshold value;
   a measurement for a beam provided by a serving transmit-receive point becomes worse than a threshold value; and
   a measurement for a beam provided by the neighbour transmit-receive point becomes offset better than a beam provided by the serving transmit-receive point.

5. The apparatus of claim 4, wherein the serving transmit-receive point comprises the first transmit-receive point and the neighbour transmit-receive point comprises the second transmit-receive point.

6. The apparatus of claim 1, wherein a cell of the first transmit-receive point and a cell of the second transmit-receive point are on a same carrier or on different carriers.

7. The apparatus of claim 1, wherein the apparatus is further caused to perform:
receiving, from the network node, a measurement configuration for causing the apparatus equipment to perform one or more further measurements on the one or more beams for which the at least one trigger condition is satisfied; and
sending, to the network node, further measurement reporting comprising the one or more further measurements.

8. The apparatus of claim 7, wherein the one or more further measurements are associated with simultaneous reception of the one or more beam for which the at least one trigger condition is satisfied and at least one further beam.

9. The apparatus of claim 7, wherein the one or more further measurements comprise layer 1 reference signal received power measurements.

10. An apparatus comprising at least one processor and at least one memory storing instructions that, when executed by the at least one processor, cause the apparatus at least to perform:
sending, to a user equipment, a group-based measurement event configuration comprising information indicating one or more trigger conditions associated with at least one group of beams, wherein each of the at least one group of beams comprises one or more beams provided by at least one of a first transmit-receive point or a second transmit-receive point; and
receiving, from the user equipment, measurement reporting comprising at least one of: one or more beam measurements on one or more beams for which at least one trigger condition of the one or more trigger conditions is satisfied; information identifying the at least one trigger condition that was satisfied; or information identifying the one or more beams for which the at least one trigger condition is satisfied.

11. The apparatus of claim 10, wherein the one or more beam measurements comprise layer 3 reference signal received power measurements.

12. The apparatus of claim 10, wherein the first transmit-receive point and second transmit-receive point are provided by a same cell or by different cells.

13. The apparatus of claim 10, wherein the one or more trigger conditions comprises one or more of:
a measurement for a beam provided by a neighbour transmit-receive point becomes better than a threshold value;
a measurement for a beam provided by the neighbour transmit-receive point become worse than a threshold value;
a measurement for a beam provided by a serving transmit-receive point becomes worse than a threshold value; and
a measurement for a beam provided by the neighbour transmit-receive point becomes offset better than a beam provided by the serving transmit-receive point.

14. The apparatus of claim 13, wherein the serving transmit-receive point comprises the first transmit-receive point and the neighbour transmit-receive point comprises the second transmit-receive point.

15. The apparatus of claim 10, wherein a cell of the first transmit-receive point and a cell of the second transmit-receive point are on a same carrier or on different carriers.

16. The apparatus of claim 10, wherein the apparatus is further caused to perform:
determining, based on the measurement reporting, a measurement configuration for causing the user equipment to perform one or more further measurements on the one or more beam for which the at least one trigger condition is satisfied;
sending, to the user equipment, the measurement configuration; and
receiving, from the user equipment, further measurement reporting comprising the one or more further measurements.

17. The apparatus of claim 16, wherein the one or more further measurements are associated with simultaneous reception by the user equipment of the one or more beam for which the at least one trigger condition is satisfied and at least one further beam.

18. The apparatus of claim 16, wherein the one or more further measurements comprise layer 1 reference signal received power measurements.

19. A method comprising:
receiving, from a network node, a group-based measurement event configuration comprising information indicating one or more trigger conditions associated with at least one group of beams, wherein each of the at least one group of beams comprises one or more beams associated with at least one of a first transmit-receive point or a second transmit-receive point;
performing one or more beam measurements for the beams comprised in the at least one group of beams;
determining, based on the one or more beam measurements, that at least one of the one or more trigger conditions is satisfied for one or more beams within the at least one group of beams; and
in response to the determining, sending, to the network node, measurement reporting comprising at least one of: the one or more beam measurements on the one or more beams for which the at least one trigger condition is satisfied; information identifying the at least one trigger condition that was satisfied; or information identifying the one or more beams for which the at least one trigger condition is satisfied.

20. The method of claim 19, wherein the one or more trigger conditions comprises one or more of:
a measurement for a beam provided by a neighbour transmit-receive point becomes better than a threshold value;
a measurement for a beam provided by the neighbour transmit-receive point become worse than a threshold value;
a measurement for a beam provided by a serving transmit-receive point becomes worse than a threshold value; and
a measurement for a beam provided by the neighbour transmit-receive point becomes offset better than a beam provided by the serving transmit-receive point.

* * * * *